United States Patent
Barker

[15] 3,668,795
[45] June 13, 1972

| | | | |
|---|---|---|---|
| [54] | IDENTIFICATION MEANS | | |
| [72] | Inventor: | Ronald C. Barker, Weston, Mass. | |
| [73] | Assignee: | Applied Laser Technology, Incorporated, Wilmington, Del. | |
| [22] | Filed: | May 27, 1969 | |
| [21] | Appl. No.: | 828,183 | |
| [52] | U.S. Cl. | ....................................40/2.2, 283/6, 283/7 | |
| [51] | Int. Cl. | ..............................................G09f 3/02 | |
| [58] | Field of Search | ....................40/2.2, 158; 283/6, 7 | |
| [56] | References Cited | | |
| | UNITED STATES PATENTS | | |
| 3,512,286 | 5/1970 | Siegel .....................................40/2.2 | |
| 3,552,853 | 1/1970 | Sanders et al. ...........................40/2 x | |
| 3,571,957 | 3/1971 | Cumming ................................40/2.2 | |
| 2,952,080 | 9/1960 | Avakian et al. .......................283/7 UX | |
| 3,468,046 | 9/1969 | Makishima ..............................40/2.2 | |

Primary Examiner—Robert W. Michell
Assistant Examiner—Wencesalo T. Contreras
Attorney—Seidel, Gonda and Goldhammer

[57] ABSTRACT

Identification means having concealed bearer identifying indicia in the form of a hologram.

4 Claims, 3 Drawing Figures

PATENTED JUN 13 1972 3,668,795
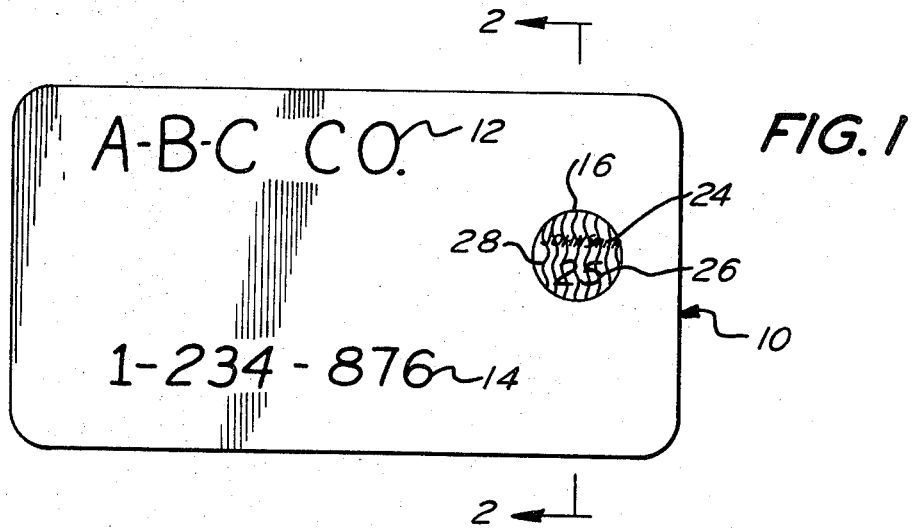
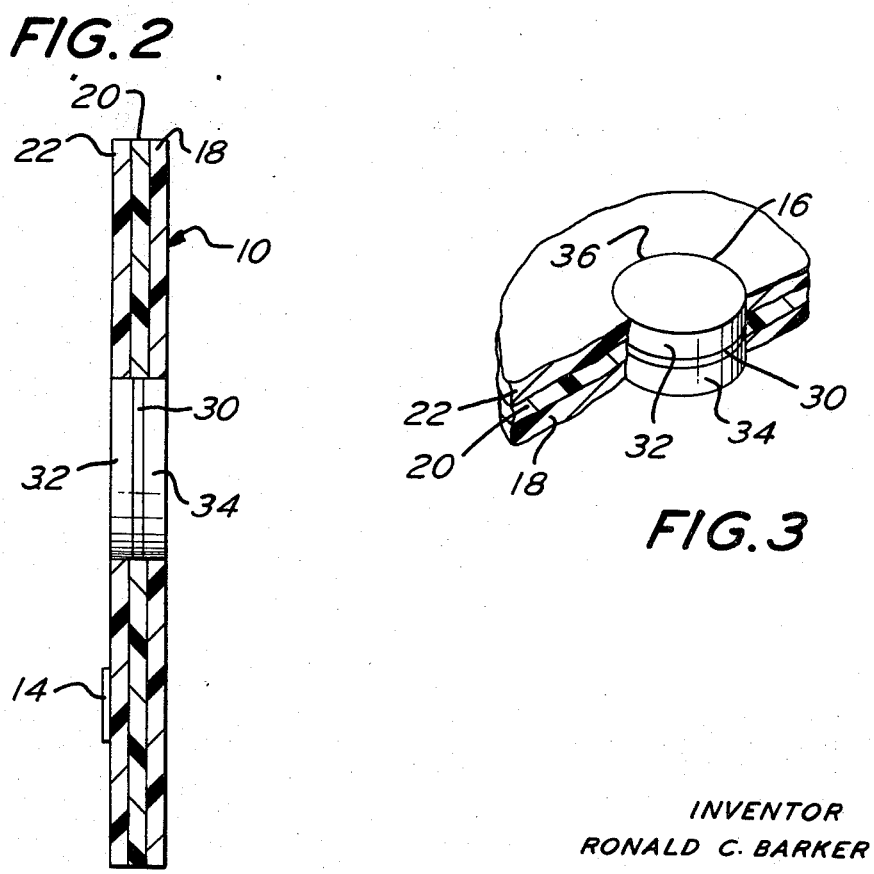
INVENTOR
RONALD C. BARKER
BY
Seidel, Gonda & Goldhammer
ATTORNEYS.

IDENTIFICATION MEANS

This invention relates to identification means. More particularly, this invention relates to identification means in the form of a credit card in which the identifying indicia is mounted in the form of a hologram.

The growth of the use of credit to charge purchases of goods and services to individual accounts in the United States and abroad has created a number of management problems. Among these is the improper and illegal use of the means for identifying the individual or individuals entitled to credit. Such identification means are most generally referred to as "credit cards" and hence will be referred to by that name herein. In its present form, a credit card is usually an oblong piece of laminated plastic which bears the name of the enterprise issuing the credit, the name of the person entitled to the credit, and some other form of indicia identifying the person. The identifying indicia usually takes the form of a nine or ten digit number in a font capable of being read by automatic reading means. The name of the person and the identifying indicia are usually embossed on the credit card so that they may be imprinted on an invoice. In addition, most credit cards have a place for the person's signature. This signature is most often compared with a signature of the bearer on the credit card for purposes of making identification.

As stated above, there are very serious problems arising through the improper and illegal use of the typical credit card. The term "illegal use" is used herein to mean use of the credit card by a person or persons who are not named on the credit card or in privy with the person so named. Examples of illegal use would be a use by a person who has come into possession of a stolen or lost credit card. The term "improper use" as used herein means use by a person or persons who are properly in possession of the credit card, but whose credit has been revoked or has been overextended.

Regardless of whether the use of the credit card falls within either the improper use or illegal use category, it is important that the person selling the goods or services on credit granted by means of the credit card have a more certain way of identifying the bearer of the card.

The present invention relates to identifying means such as a credit card bank passbook, passport and the like for use by a bearer to identify himself as the authorized user. In accordance with the present invention, the identification means bears certain identifying information, but only a portion of it can be directly viewed. That information that can be directly viewed is the identity of the enterprise issuing the credit card, a font of embossed numerals for recording on the invoice and, if desired the embossed name of the authorized user. In addition, the credit card or other identification means of the present invention includes a coded hologram bearing information sufficient to identify the person authorized to use the credit card.

The advantage of using a coded hologram in a credit card is that when viewed directly or without special apparatus, the image does not appear. However, it can be reconstructed by using suitable holographic apparatus. Thus, an unauthorized person in possession of the credit card cannot learn the name of the person authorized to use the credit card except by the use of special holographic equipment. In accordance with my copending patent application Ser. No. 828,184 filed May 27, 1969, now U.S. Pat. No. 3,620,590 the hologram of the present invention is further concealed by using a scrambling technique. Thus, only specialized apparatus suitable for reconstructing a coded hologram can be used to learn the identifying indicia in the hologram.

The present invention relates to the identifying means to be used with such special reconstruction apparatus.

For the purpose of illustrating the invention, there is shown in the drawings a form which is presently preferred; it being understood, however, that this invention is not limited to the precise arrangements and instrumentalities shown.

FIG. 1 is a planar view of the identifying means in accordance with the present invention.

FIG. 2 is a transverse sectional view of the identifying means in accordance with the present invention.

FIG. 3 is a perspective view of a portion of the identifying means in accordance with the present invention.

Referring now to the drawing in detail, wherein like numerals indicate like elements, there is shown in FIG. 1 a planar view of the identifying means 10 in accordance with the present invention. As shown, the identifying means is a credit card which includes indicia 12 identifying the enterprise issuing the credit card, embossed indicia 14 in the form of numerals in a font which can be read by automatic reading equipment, and a hologram 16. The card 10 including the indicia 12 and embossed indicia 14 are conventional. Thus, as shown in FIG. 2, it consists of a plurality of laminated sheets of plastic material 18, 20 and 22, which form a stiff, resilient substrate for the aforesaid indicia. It should be pointed out that there is no place provided on the credit card for the authorized bearer's signature. Indeed, in use, it is best that the signature of the user not appear on the card. Rather, the signature should appear as a holographic image in the hologram 16 so as to be concealed from direct view.

In accordance with the present invention, the holographic image formed on the hologram 16 consists of two informational items and a master code to scramble such informational items. Referring to FIG. 1, the first informational item is the authorized bear's signature "John Smith" 24 and an alpha-numeric such as numeral "25" indicated by 26. The scrambling master code is indicated by the numeral 28. The effect of the scrambling master code 28 is eliminated when the credit card 10 is used with the apparatus disclosed in my aforesaid copending patent application. Its effect is to prevent unauthorized persons from recreating the identifying indicia using conventional holographic apparatus.

The signature 24 of course identifies the bearer. It cannot be directly viewed. Indeed, it cannot be observed except by someone who also has the specialized image reconstruction apparatus. The same is true of the alpha-numeric 26. The purpose of the alpha-numeric 26 is to prevent illegal use by someone who has surreptitiously learned the name of the authorized bearer. This could be accomplished, for example, by comparing the invention credit card against the authorized bear's conventional credit cards to determine the true name and signature. The alpha-numeric 26 is specially chosen by the authorized bearer.

The hologram 16, itself, consists of a photographic medium on which the hologram has been exposed. The medium could be any one of a number of available photographic emulsions, such as Kodak 6934F emulsion.

The holographic emulsion 30 may be protected by laminating it between two sheets of transparent laminating material such as plastic or glass. The emulsion described above is equally transmissive. Thus, the hologram 16 is transmissive.

The hologram 16 including the emulsion 30 and protective sheets 32 and 34 may be formed into a slug, which may be a right cylinder. The thickness of the slug including the emulsion and sheets 32 and 34 should be equal to the thickness of the credit card 10. The sheets 32 and 34 may be joined to the emulsion 30 either by a heat process which does not damage the emulsion or by using a clear adhesive. The latter process is the preferred form, to avoid the high temperatures and pressures normally required for plastic laminating processes.

The hologram 16 formed as described above is fitted in a hole 36 punched or otherwise formed in the credit card 10. The hologram may be fixed in the hole 36 by any conventional means such as an adhesive.

Although the present invention has been described in a form in which the hologram 16 is transmissive, those skilled in the art will readily recognize that it could also be reflective. In that case, one of the sheets of laminae could be made opaque and also be provided with a reflective surface.

Moreover, other means than the manner described herein may be used for affixing the hologram to the identifying means.

The present invention may be embodied in other specific forms without departing from the spirit or essential attributes thereof.

I claim:

1. Identifying means comprising a plurality of sheets of laminated plastic, an opening through said identifying means in a portion thereof, first indicia mounted on a portion of said identifying means, a photographic medium, a hologram exposed on said medium, said hologram comprising second indicia, first and second transparent sheets laminated to each side of said photographic medium so that said first and second transparent sheets and said photographic medium define a slug, and said slug is mounted in said opening so that said first and second indicia cooperate together when said identifying means is used for identifying purposes.

2. Identifying means in accordance with claim 1 wherein said hologram is coded so that said second indicia is intelligible only after the use of holographic apparatus and decoding means.

3. Identifying means in accordance with claim 1 wherein said photographic medium is transmissive.

4. Identifying means in accordance with claim 1 wherein said photographic medium is opaque.

* * * * *